D. R. YARNALL.
APPARATUS FOR HEATING AND MEASURING WATER.
APPLICATION FILED APR. 8, 1912.
1,064,806.
Patented June 17, 1913.
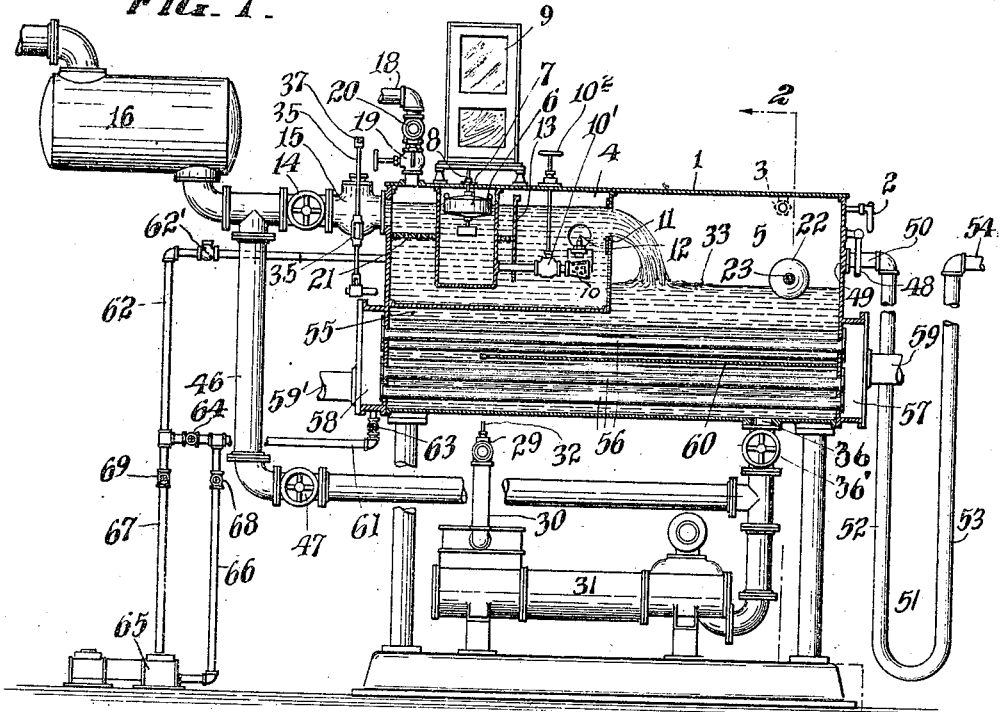
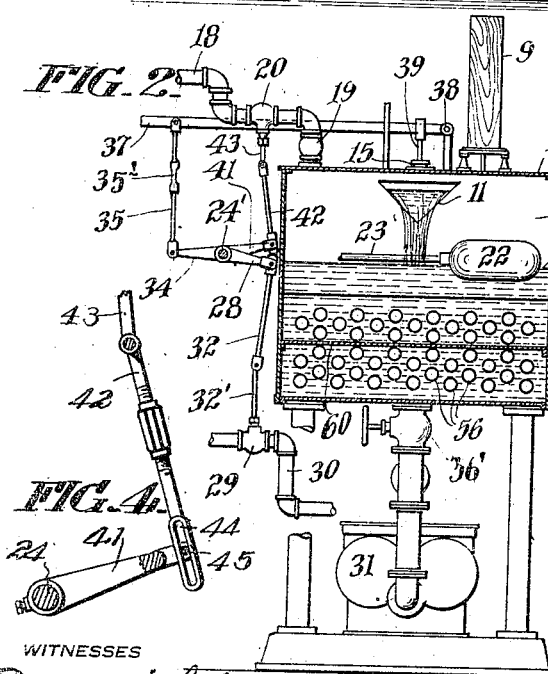
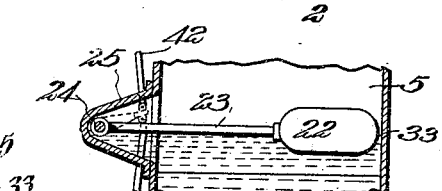
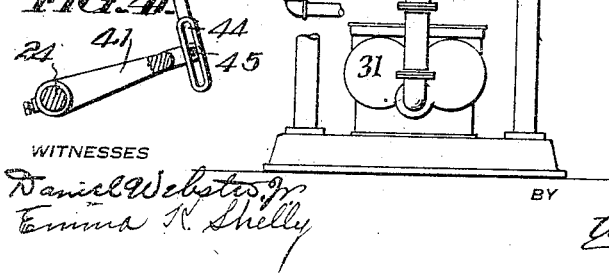
WITNESSES
Daniel Webster Jr
Emma K. Shelly
INVENTOR
David Robert Yarnall
BY
Wm Steell Jackson
ATTORNEY

UNITED STATES PATENT OFFICE.

DAVID ROBERT YARNALL, OF PHILADELPHIA, PENNSYLVANIA.

APPARATUS FOR HEATING AND MEASURING WATER.

1,064,806.

Specification of Letters Patent.  Patented June 17, 1913.

Application filed April 8, 1912. Serial No. 689,144.

*To all whom it may concern:*

Be it known that I, DAVID ROBERT YARNALL, a citizen of the United States, residing at Philadelphia, in the county of Philadelphia and State of Pennsylvania, have invented a certain new and useful Apparatus for Heating and Measuring Water, of which the following is a specification.

The purpose of my invention is to heat water within one of the water holding compartments of a weir meter.

A further purpose of my invention is to provide positive control of the withdrawal of water from a meter storage compartment used as a heater by automatic control of the pump.

A further purpose of my invention is to control the return and make-up water for any heater system proportionately to the height of water in the storage compartment in a preferably pressure-tight gravity meter.

A further purpose of my invention is to provide a heater within the effective compartments of a meter, and to control the water admitted to the meter and, preferably, also the make-up water, in proportion to the height of water in the storage tank of the meter.

A further purpose of my invention is to place the measuring tank of a gravity meter, a portion of the storage therefrom and a water heater or as many of them as possible, in line vertically, with the pump preferably below the meter storage compartment, to economize floor space, piping and expense and reduce heat losses.

A further purpose of my invention is to preferably extend the discharge or storage compartment of a weir meter beneath the receiving compartment thereof and to place a water heater in the normal storage space, as well as, where the storage is so extended in the space extending beneath the receiving compartment.

A further purpose of my invention is to connect any suitable water heater effectively within a weir meter, placing it before or after the weir in the meter as required or desired because of other considerations affecting the system, and to control the supply to and discharge from the water heater, the make-up water and the operation of the pump, preferably controlling all of these and all automatically by the height of water within the storage chamber of the meter, maintaining pressure within the meter casing or not, as desired.

A further purpose of my invention is to deliver feed water directly from a meter measuring compartment to a water heater, preferably within the same meter casing, providing a self-contained meter unit, within one compartment of which a closed water heater may be located.

I prefer to illustrate my invention by forms thereof which I have determined to be practical, efficient and relatively inexpensive, and which at the same time well illustrate the principles thereof.

Figure 1 is a side elevation, partly in vertical longitudinal section, of the preferred form of my invention. Fig. 2 is a section of the structure of Fig. 1 upon line 2—2 thereof, looking in the direction of the arrows. Fig. 3 is a side elevation of a structure similar to Fig. 1, showing my invention. Fig. 4 is a partial section upon line 4—4 of Fig. 3 looking in the direction of the arrows. Fig. 5 is a broken section on the line 5—5 of Fig. 3 of my preferred construction showing my float and some of its connections.

Similar numerals of reference in the drawings indicate like parts.

In my preferred form I show a meter tank 1, provided with thermostatic valve 2 and flap or vacuum-break valve 3, shown in my co-pending application Serial No. 687,630, for fluid meter, filed April 1, 1912, for the purpose of exhausting the space within the compartments 4 and 5 of air, when the pressure within the meter casing exceeds atmospheric pressure, and of preventing vacuum within the chamber when connected so as to benefit from pressure conditions there, or, with, reversed setting of the valve, for preventing pressure when intended for use with vacuum pans or surface condensers. The detail of these valve structures is not intended to be claimed independently by me, and for that reason they are not more fully illustrated. For their construction and use, further than here indicated, I would refer to my co-pending application above stated.

I have preferred to illustrate not only a gravity meter, but a meter of the weir type, whose upper or receiving chamber 4 and storage chamber 5 are in full communication at their upper ends for exchange of pressure, gas and vapor, so that the same conditions of pressure or vacuum are maintained throughout. The same is true of the float chamber 6 illustrated, whether this float chamber be actually within the meter casing, as illustrated and preferred, or not. It is intended to be kept in communication with the other chambers both above and below the water level. It contains the float 7 through whose rod 8 any form of recorder or integrator within the casing 9 may be operated, one form of which is fully disclosed in U. S. patent to Lea 815,102. In each of my forms, also, I prefer to introduce the water to the float chamber 6 through screened opening 10, controlled by valve 10' through handle 10². I have shown weir 11, and zero point 12 in line with a sight opening. I have used a baffle plate 13, to free the water in proximity to the weir from disturbance by the intake water.

I prefer to introduce the intake water through a controlling valve 14 and to automatically control the admission of water by a valve 15, which will be more fully described hereafter. The intake water may be, for example, return water, coming from any part of a heating system, or cold water supply, from whatever source. I have shown the intake as connected through a receiving or storage equalizing tank 16 in Fig. 1; and as coming from any tank 17 in Fig. 3.

I prefer to admit the make-up water into the measuring meter compartment, as through pipe 18, controlled by hand valve 19, and preferably normally closed automatic valve 20, hereinafter more fully described. In this case I prefer to introduce it upon the opposite side from the weir of the baffle plate 13, so as to reduce the disturbing influence of the influx of water at this point. However, the quantity of make-up water used will be ordinarily very small and I prefer not to insert it until the low level of the water in the storage compartment indicates failure to receive sufficient supply from the "return" water. The perforated plate 21 reduces water surging without interfering with the operation of the meter.

I provide for control of the inlet and discharge water admitted to and taken from the weir tank, preferably using the same means for control of both. I have illustrated one form of this in a float 22 connected by lever arm 23 with a shaft 24 in a pocket 25. The rod passes out of the pocket near this connection and is packed at 26, so as to lie chiefly exterior to the tank, as at 24'. This shaft is supported in suitable bearing 27 and carries lever arms in proportion to the number of valves to be operated by it. In the illustration it starts, stops and regulates the pump, controlling the discharge 36 through valve 36'. The connections shown are a lever 28, Fig. 2, upon the rod, a valve 29 in the steam supply pipe 30 for the pump 31 and a rod 32 and valve stem 32' between, whereby the pump may be started and stopped or controlled by reason of the rise or fall of the level 33 due to variation of the water height in the storage compartment 5 of the meter. I have controlled the intake water similarly and have illustrated, for this purpose, a lever arm 34, upon the opposite side of the shaft from the lever arm 28. It operates a rod 35 adjustable by turn-buckle 35', whereby lever 37, pivoted at 38, is raised, lifting the stem 39 to open the valve 15 and admit additional intake water as the level of the water at 33 is reduced, or cut off the main intake supply of water as the height of water at 33 is increased.

The make-up water is preferably controlled by the same means as that which controls the main intake, or by coincidentally operating means. I have preferred to control this by lever 41 upon the same shaft 24' as the other levers to which I have referred, and connect the lever 41 with the valve 20 by any suitable rod 42 and stem 43. It will thus be seen that any increase in water level within the storage compartment 5 will result in increasing the supply of steam to the pump at the same time that the main intake valve is partially closed and that the make-up water may be correspondingly reduced or shut off. I prefer that the control of the make-up water should not be as sensitive as the control of the main intake and that the valve in the make-up water pipe shall be normally closed, in order that the make-up water may not be drawn upon to make up or equalize minor inequalities or delays in delivery of the return water, but may be drawn upon to make up permanent shortage and permanent shortage only. One construction which insures this operation of the normally closed make-up water valve 20 is shown in Fig. 4. In it I provide a slot 44 in the lower end of the rod 42, so that the pin 45 upon the arm 41 may not engage the end of the slot until the level of the water at 33 becomes low enough to indicate a serious or permanent shortage of water.

It will be evident that I provide for pump operation substantially in proportion to the evaporation at the boiler, since I determine the pump operation by the mean return from the heating system. The make-up water applied is small.

To provide for repairs to the meter unit I have shown a by-pass 46 within which I have placed a valve 47.

The height of water in the storage chamber of the meter is shown in a gage glass 48.

While the automatic control of the main and make-up water intakes and the operation of the pump by the float 22 fully protect against flooding of the meter, whether weir or of any other gravity type, derangement of this automatic control might make further protection desirable or necessary, and I have, therefore, supplied additional protection which may be used as auxiliary to the automatic control indicated or may be advantageously employed when all or any part of the automatic control is not desired.

At any suitable upper water limit 49 I place an overflow pipe 50, which might be easily vented to the atmosphere but for the preferred use of my construction under pressure or vacuum meter conditions. I have accommodated this overflow to pressure or vacuum interchangeably at the same time that I have made it operative as a resilient safety valve, by connection thereto of a U tube 51, comprising arms 52 and 53. I prefer to have the outlet 54, from arm 53, at the same level as the overflow opening 49, so that water will just flow out freely as the level of 49 is reached. When the water lies below the level of the opening 49, this opening, and consequently the content of the tube, is exposed to whatever pressure or vacuum conditions are maintained within the meter casing. The protective action of the tube will be readily understood from the discussion of its operation under pressure. With a vacuum the conditions are reversed. Whatever the pressure in the meter casing, the water in the arm 52 will be correspondingly depressed until the weight of the water in the unbalanced portion within 53 corresponding to the extent of depression of the water in the arm 52 equals the pressure within the meter casing. The static pressure of the unbalanced column of the water is thus used to counter-balance the pressure within the casing. Any increase of pressure within the casing will shove the water down a little farther in the arm 52, against a resilient or cushioned resistance, spilling a little more water out of the opening at 54, while a reduction of pressure within the casing will result in the unbalanced column within arm 53 being reduced as the water is forced up somewhat within arm 52. Unlike the ordinary safety valve, the pressure is relieved somewhat at and by the tube as the pressure approaches the limit at which it is intended to be released. The tube thus forms a vapor seal at all times unless and until the pressure within the meter tank exceeds the weight of the column of water within the arm 53 of the tube, at which time the vapor is given free access to the atmosphere through the tube. This free vent of the meter casing, once begun, will continue until the tube is again filled with water. The pressure at which the vent may take place, i. e. the limit of pressure set for the interior of the meter casing, can be accurately predetermined by the height of the U tube.

I use a portion of the effective meter for feed water heater purposes. This is most advantageously done within the storage compartment, which can be extended to give additional length for the tubing and is desirably of good sized horizontal sectional area, as well as depth, readily accommodating the heater pipes. Either compartment, of course, could extend from wall to wall of the meter casing in either direction making it conveniently accessible for admission and discharge heater connections. My preferred heater, too, differs from usual closed heaters in that the steam passes through the pipes and the water surrounds them. It is further highly preferable to place the heating means in the effective storage compartment rather than the receiving compartment, since the water would otherwise have opportunity to cool in the relatively large storage required in the other compartment, which cannot be withdrawn too closely to the bottom, lest the pump be damaged by drawing air instead of water and racing correspondingly. I have therefore preferred to select the storage compartment for the location of my heater within the meter, and show steam tubes therefor. In Fig. 1 I have shown the storage compartment as extended below the receiving and measuring compartment, as at 55, itself highly advantageous in increasing the storage without increase of floor space required, and have made use of a portion of this extended storage space, as well as a portion of the storage space not under the receiving and measuring compartment, for water heater purposes.

I have shown steam pipes 56 as extended from end to end of the meter casing, connecting with headers 57, 58 to form a closed feed water heater within the storage compartment. I supply preferably exhaust steam thereto by means of pipe 59 and withdraw the steam therefrom at 59′. I have considered the further detail of the heater steam connections as unnecessary since they would be the same as those of any separate closed feed water heater.

In order to insure circulation within the heater portion of the meter I have provided a longitudinal baffle plate 60 so that the water must pass from the right end, in the view, above the baffle plate around the end of the plate to the right end, in the view, below the baffle plate where discharge of the storage water thus heated, takes place. Assuming that the pressure within the steam tubes of the closed water heater shown will normally exceed the pressure within the meter casing, I have provided for delivery of the water of condensation from the said tubes to the receiving or float chamber compartment of the meter by reason of this difference in pressures, connecting the header 58 with the receiving compartment of the meter, below the water level thereof, by piping shown at 61 and 62, check valved against return at 62'. It is valved at 63 and 64 so that a pump or return trap 65 and connections 66 and 67, valved at 68 and 69, may be used for delivery of this water to the meter compartment where the pressure does not accomplish this result.

The space between the tubing of the heater is utilized as storage space within the storage compartment of the meter without interference with its function as water space for heater purposes, resulting in considerable economy of space. Correspondingly, the same storage space can be obtained within the meter with but slight enlargement of the meter casing, the enlargement equaling the volume of the tubing only, greatly reducing the cost as well as the space required and making it possible to place a feed water heater on the same floor space already in use for the meter and at substantially the same elevation.

Having thus described my invention, what I claim as new and desire to secure by Letters Patent is:—

1. In an apparatus for heating and measuring water, a water receiving meter compartment, a water storage compartment, means for measuring gravity flow of water from the receiving to the storage compartment and a continuously operative closed water heater entering the water space of the storage compartment.

2. In an apparatus for heating and measuring water, a water receiving meter compartment, a water storage compartment, extending beneath the receiving compartment, means for measuring gravity flow of water from the receiving to the storage compartment and continuously operative closed water heating means located in the storage compartment.

3. In an apparatus for heating and measuring water, a water receiving meter compartment, a water storage compartment extending beneath the receiving compartment, means for measuring gravity flow of water from the receiving to the storage compartment, continuously operative closed water heating means located in the lower part of the storage compartment and connections for conducting steam to said water heating means.

4. In an apparatus for heating and measuring water, a water receiving meter compartment, a water storage compartment, means for measuring gravity flow of water between the compartments, steam tubing entering said storage compartment beneath the water surface and connections for continuously supplying steam to said tubing.

5. In an apparatus for heating and measuring water, a water receiving meter compartment, an intake water connection for said compartment, a water storage compartment, a discharge connection from said storage compartment, means for measuring gravity flow of water between the compartments, continuously operative closed water heating means in the bottom of the storage compartment and automatic intake and discharge regulation for maintaining a substantially uniform height of water in the storage compartment.

6. In an apparatus for heating and measuring water, a water receiving meter compartment, an intake water connection thereto, a water storage compartment, means for measuring gravity flow of water between the compartments, a discharge connection from the storage compartment, water heating tubing in the lower part of the storage compartment, connections for continuously supplying and withdrawing steam to and from said tubing and automatic regulating means for maintaining the water level above the height of the tubing.

7. An apparatus for heating and measuring water comprising a meter casing divided into receiving and storage water compartments having gravity water connection between, means for measuring flow of water between the compartments by the head of water in the receiving compartment and a continuously operative closed water heater beneath the water surface in one of the compartments.

8. In an apparatus for heating and measuring water, measuring and storage water compartments, means for measuring gravity flow of water between the compartments and a continuously operative closed steam tubular heater entering one of said compartments beneath the water level thereof.

9. In an apparatus for heating and measuring water, measuring and storage water compartments, intake and discharge connections therefor, means for measuring gravity flow of water between the compartments, a continuously operative closed heater in the storage compartment and means for maintaining the water level above the height of the heater in the storage compartment.

10. In an apparatus for heating and measuring water, a water receiving compartment, a water storage compartment thereunder, means for measuring the gravity flow of water between the compartments and a continuously operative closed water heater combined with the storage compartment to heat the water therein.

DAVID ROBERT YARNALL.

Witnesses:
WM. STEELL JACKSON,
MARY M'CALLA.